US009936640B2

(12) United States Patent
Aguas-Alvarado et al.

(10) Patent No.: US 9,936,640 B2
(45) Date of Patent: Apr. 10, 2018

(54) METHOD FOR HARVESTING, HANDLING AND PACKING BERRIES PICKED DIRECTLY FROM THE PLANT

(71) Applicant: Naturipe Berry Growers, Inc., Salinas, CA (US)

(72) Inventors: Mario Aguas-Alvarado, Salinas, CA (US); Laura Vazquez-Contreras, Salinas, CA (US)

(73) Assignee: Naturipe Berry Growers, Inc., Salinas, CA (US)

( * ) Notice: Subject to any disclaimer, the term of this patent is extended or adjusted under 35 U.S.C. 154(b) by 0 days.

(21) Appl. No.: 15/707,946

(22) Filed: Sep. 18, 2017

(65) Prior Publication Data

US 2018/0049370 A1    Feb. 22, 2018

Related U.S. Application Data

(62) Division of application No. 14/819,347, filed on Aug. 5, 2015, now Pat. No. 9,795,085.

(60) Provisional application No. 62/033,516, filed on Aug. 5, 2014.

(51) Int. Cl.
   *A01D 46/22*    (2006.01)
   *B65D 21/08*    (2006.01)
   *A45F 5/02*    (2006.01)

(52) U.S. Cl.
   CPC .............. *A01D 46/22* (2013.01); *A45F 5/021* (2013.01); *B65D 21/086* (2013.01)

(58) Field of Classification Search
   CPC ...... A01D 46/00; A01D 46/22; B65D 21/086; A45F 5/021

USPC ............................................................ 220/8
See application file for complete search history.

(56) References Cited

U.S. PATENT DOCUMENTS

| 1,346,033 A | * | 7/1920 | Keith | A01D 46/22 224/610 |
| 1,383,956 A | * | 7/1921 | Kiley | A01D 46/22 224/610 |
| 1,447,402 A | * | 3/1923 | Anderson | A01D 46/22 224/197 |

(Continued)

FOREIGN PATENT DOCUMENTS

| DE | 20000393 U1 | * | 5/2000 | A01D 46/22 |
| WO | WO 03081984 A1 | * | 10/2003 | A01D 46/22 |

*Primary Examiner* — Justin Larson
(74) *Attorney, Agent, or Firm* — LaRiviere, Grubman PC (57) ABSTRACT

Method for packing harvested berries directly into clamshell packages during hand harvesting. A harvester utilizes an open-topped harvesting apparatus having a plurality of bottom assemblies for supporting a shipping tray that contains a plurality of clamshell packages. The method includes the step of securing the apparatus on the harvester's belt for carrying the shipping tray. The apparatus has a side supporter disposed thereon and below belt notch-like loops. The method also includes the steps of supporting the shipping tray on a plurality of bottom assemblies disposed on the apparatus; maintaining the bottom assemblies substantially horizontal to the ground with the side supporter when the apparatus is worn by the harvester; and storing a plurality of the clamshell packages in the shipping tray for receiving berries picked directly from the plant for eliminating multiple touches of said berries for improved fruit quality.

17 Claims, 7 Drawing Sheets

(56) References Cited

U.S. PATENT DOCUMENTS

| | | | | |
|---|---|---|---|---|
| 1,450,221 A * | 4/1923 | Owens | A01D 46/22 | 217/13 |
| 1,454,779 A * | 5/1923 | Wells | A01D 46/22 | 224/604 |
| 1,481,418 A * | 1/1924 | Darby | A01D 46/22 | 224/633 |
| 1,487,684 A * | 3/1924 | Oliver | A01D 46/22 | 224/197 |
| 1,645,360 A * | 10/1927 | Taylor | A01D 46/22 | 224/611 |
| 1,664,465 A * | 4/1928 | Purchas | A47B 88/90 | 160/225 |
| 1,703,450 A * | 2/1929 | Jakku | A01D 46/22 | 224/629 |
| 1,875,585 A * | 9/1932 | Freimann | A01D 46/22 | 224/611 |
| 2,130,976 A * | 9/1938 | Stone | A01D 46/22 | 224/628 |
| 2,158,999 A * | 5/1939 | Allen | A01D 46/22 | 224/611 |
| 2,739,776 A * | 3/1956 | Terando | B65D 19/0002 | 108/54.1 |
| 2,840,257 A * | 6/1958 | Zeni | B65D 7/24 | 220/8 |
| 2,873,934 A * | 2/1959 | Settles | B65D 19/0097 | 108/54.1 |
| 3,319,799 A * | 5/1967 | Paxton | A01D 46/22 | 108/53.3 |
| 3,507,311 A * | 4/1970 | Wilson | A01D 46/22 | 224/633 |
| 3,887,102 A * | 6/1975 | Earley | F25D 25/022 | 220/8 |
| 4,102,376 A * | 7/1978 | Sharp | A01D 46/22 | 206/523 |
| 4,244,485 A * | 1/1981 | Trammell | A45C 5/045 | 220/485 |
| 4,246,944 A * | 1/1981 | Dixie | A01D 46/22 | 193/7 |
| 4,452,383 A * | 6/1984 | Marttinen | A01C 7/02 | 224/258 |
| 4,629,086 A * | 12/1986 | Trubiano | B65D 19/12 | 220/489 |
| 4,925,071 A * | 5/1990 | Fleming | A01D 46/22 | 224/236 |
| 5,170,918 A * | 12/1992 | Perron | A01C 11/006 | 224/270 |
| 5,201,446 A * | 4/1993 | Martin | A01D 46/22 | 206/523 |
| 5,310,102 A * | 5/1994 | Hougham | B65B 67/1227 | 224/222 |
| 6,076,692 A * | 6/2000 | Avot | B65D 21/086 | 220/4.03 |
| 6,354,455 B1 * | 3/2002 | Chen | B65D 7/28 | 220/489 |
| 6,419,135 B1 * | 7/2002 | Sali | A45C 7/0063 | 224/610 |
| 8,991,140 B2 * | 3/2015 | Dorn | A01D 46/20 | 280/209 |
| 9,271,558 B1 * | 3/2016 | Sandford | A45F 3/04 | |
| 9,795,085 B2 * | 10/2017 | Aguas-Alvarado | A01D 46/22 | |
| 2010/0269477 A1 * | 10/2010 | Cornejo Rojas | A01D 46/22 | 56/328.1 |
| 2016/0157427 A1 * | 6/2016 | Aguas-Alvarado | A01D 46/22 | 224/682 |

\* cited by examiner

METHOD FOR HARVESTING, HANDLING AND PACKING BERRIES PICKED DIRECTLY FROM THE PLANT

PRIORITY CLAIM

This application is a divisional application, claiming priority to co-pending U.S. patent application Ser. No. 14/819,347, filed Aug. 5, 2015, which claims priority to Provisional Patent Application No. 62/033,516, entitled "An Apparatus, Method and System for Harvesting, Handling and Packing Berries Picked Directly from the Plant", filed on Aug. 5, 2014.

TECHNICAL FIELD

The present invention relates to a one touch method for harvesting, handling and packing berries picked directly from the plant.

BACKGROUND OF THE INVENTION

In conventional methods and systems for harvesting, handling, and packing berries, about 99% of the caneberry industry in California still practices a harvesting method and system that involves touching the berries multiple times. In fact, when this method and system is used, fruit is picked directly from the plant and then deposited into containers lined with plastic. Once a picker fills up 3 or 4 of the containers, the fruit is then brought to a packing table. Once on the table, the fruit is then transferred to a clamshell. Once the clamshell is filled, it is then transferred to a tray until the tray is filled and then turned into Quality Control for inspection.

The current method and system used for harvesting and packing berries poses problems to the quality of the berries, since they are subjected to multiple steps and handling. For example, once the berries are picked from the plant, they are deposited into containers lined with plastic. This can damage the berries since they can be easily crushed and/or bruised while being loaded into the containers. Moreover, the berries can be crushed and/or bruised when they are transferred from the containers to the clamshells. Further, once the clamshells are filled, they are then transferred to a tray until full which poses yet another threat to the quality of the berries.

An additional problem with the current method and system used for harvesting and packing berries is that it can be expensive to implement. For example, the current method and system entails an ongoing cost of requiring containers lined with plastic on a harvest year basis. Moreover, the current method and system requires the use of packing tables and trailers which pose a safety problem when the terrain is uneven.

In light of the shortcomings in the prior art, there is definitely a need for an improved method, system, and apparatus for harvesting, handling, and packing berries that eliminates unnecessary steps that pose a threat to the quality of the berries and strengthens a company's product integrity program. Further, there is a need for an improved method, system, and apparatus for harvesting, handling, and packing berries that decreases the costs incurred by companies growing berries.

SUMMARY OF THE INVENTION

One aspect of the present invention is to provide a light-weight basket-like carrier that includes two belt notch-like loops for allowing the apparatus to be placed and secured on a belt worn by a harvester.

Another aspect of the present invention is to provide a one touch method and system for harvesting and packing berries directly from the plant by placing the berries directly into clamshell packages which are contained in a cardboard shipping tray which, in turn, is placed securely in the carrier. Once the shipping tray is full of filled clamshell packages it is deposited on a carrying tray.

An additional aspect of the present invention is to eliminate multiple touches of the berries which leads directly to improved fruit quality and food safety, and also leads directly to substantial cost savings by eliminating claims based on damage to fruit.

A further aspect of the present invention is to eliminate unnecessary costs such as the need for containers and plastic liners on a harvest year basis. More importantly, cost savings is achieved by a reduction of labor since the re-packing step is eliminated.

An even further aspect of the present invention is to reduce the number of trailers needed for storing and transporting the berries which results in less safety incidences.

The present invention is a new open-topped harvesting apparatus for packing berries into clamshell packages during hand harvesting by a harvester, said apparatus comprising a carrier having a bottom assembly for supporting a shipping tray, wherein the shipping tray contains a plurality of the clamshells. The carrier further comprising a plurality of end wall assemblies affixed perpendicular to the bottom assembly; a first side wall assembly affixed perpendicular to the bottom assembly and affixed to the plurality of end wall assemblies; a second side wall assembly affixed perpendicular to the bottom assembly and affixed to the plurality of end wall assemblies, the second side wall including at least two belt notch-like loops for allowing the harvesting apparatus to be placed and worn on a harvester's belt; and the second side wall including an arch-shaped side supporter for maintaining the bottom assembly substantially horizontal to the ground when worn by a harvester.

In this disclosure, the term carrier refers to a light-weight basket-like construction of any suitable formable rigid material, such as heavy-gauge wire, wicker, metal, wood, plastic, steel and the like.

In this disclosure, the shipping tray 80 is also referred to as tray 80. Similarly, the term carrier 10 is also referred to as tray carrier 10 in this Specification.

The present invention further provides a new one touch harvesting method for packing berries directly into clamshell packages during hand harvesting by a harvester, the method comprising the following steps of wearing or securing an open-topped harvesting apparatus on the harvester's belt for packing berries; supporting a shipping tray on a bottom assembly located on the open-topped harvesting apparatus; maintaining the bottom assembly substantially horizontal to the ground when the open-topped harvesting apparatus is worn by the harvester, holding a plurality of the clamshells on the shipping tray for accepting berries picked directly from the plant for eliminating multiple touches of said berries for improving fruit quality; transporting the accepted berries packed in the clamshells onto a carrying tray; and bringing the carrying tray to the shipping department.

Further, the present invention provides a new one touch harvesting system for packing berries directly into clamshell packages during hand harvesting by a harvester, the system comprising an open-topped harvesting carrier worn or secured on the harvester's belt for carrying a shipping tray.

Consequently, for a better understanding of the present invention, its functional advantages and the specific objects attained by its uses, reference should be made to the accompanying drawings, claims and descriptive matter in which there are illustrated preferred embodiments of the invention.

DETAILED DESCRIPTION OF THE INVENTION

Introduction

The following detailed description is of the best currently contemplated modes of carrying out various embodiments of the invention. The description is not to be taken in a limiting sense, but is made merely for the purpose of illustrating the general principles of the invention, since the scope of the invention is best defined by the appended claims.

Detailed Description

It should be understood that the foregoing relates to various embodiments of the present invention which can be carried out independently and/or in combination and that modifications may be made without departing from the spirit and scope of the invention. It should also be understood that the present invention is not limited to the designs mentioned in this application and the equivalent designs in this description, but it is also intended to cover other equivalents now known to those skilled in the art, or those equivalents which may become known to those skilled in the art in the future.

The present invention advantageously relates to a one touch harvesting method for packing berries directly into clamshell packages during hand harvesting by a harvester. The method comprises the steps of: securing an open-topped harvesting apparatus on the harvester's belt for carrying a shipping tray, the apparatus includes a side supporter disposed thereon and disposed below belt notch-like loops; supporting the shipping tray on a bottom assembly disposed on the apparatus; maintaining the bottom substantially horizontal to the ground with the side supporter when the apparatus is worn by the harvester; and storing a plurality of the clamshell packages in the shipping tray for receiving berries picked directly from the plant for eliminating multiple touches of said berries for improved fruit quality.

Figure 1:
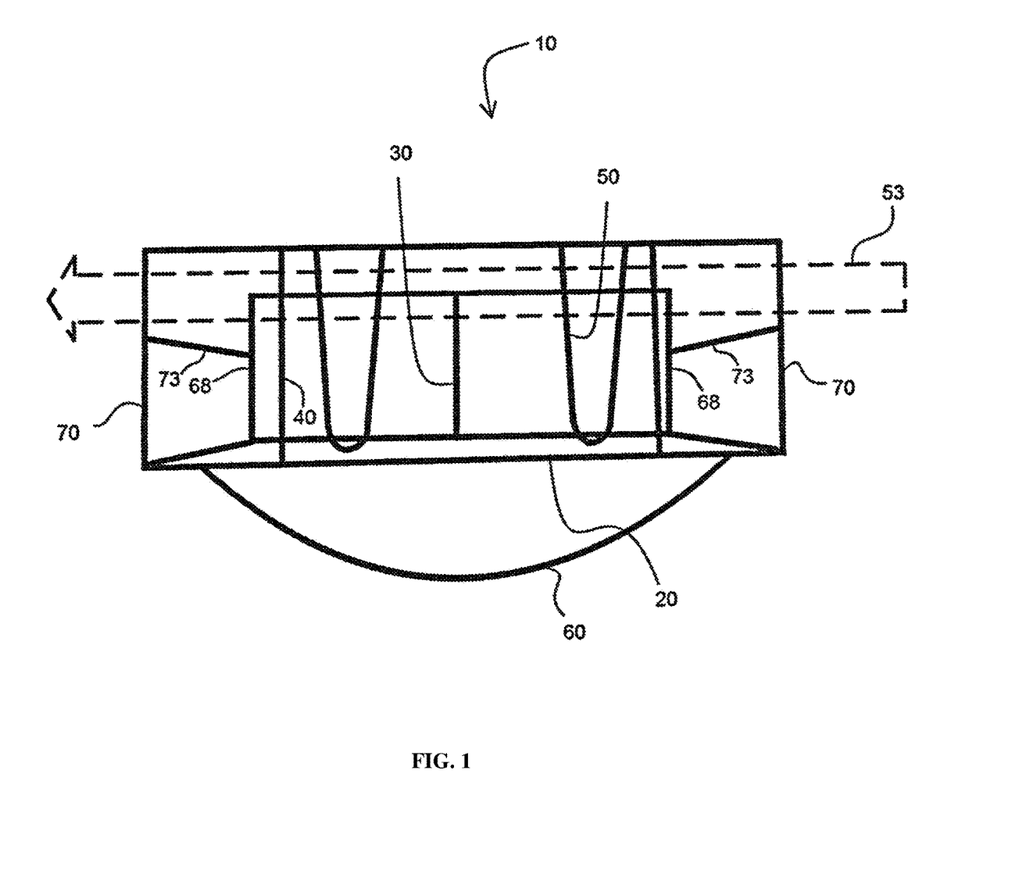
FIG. 1 is a rear view of the open-topped harvesting carrier which is also referred to as the open-topped apparatus or the open-topped harvesting rack or just as the carrier.
Figure 4:
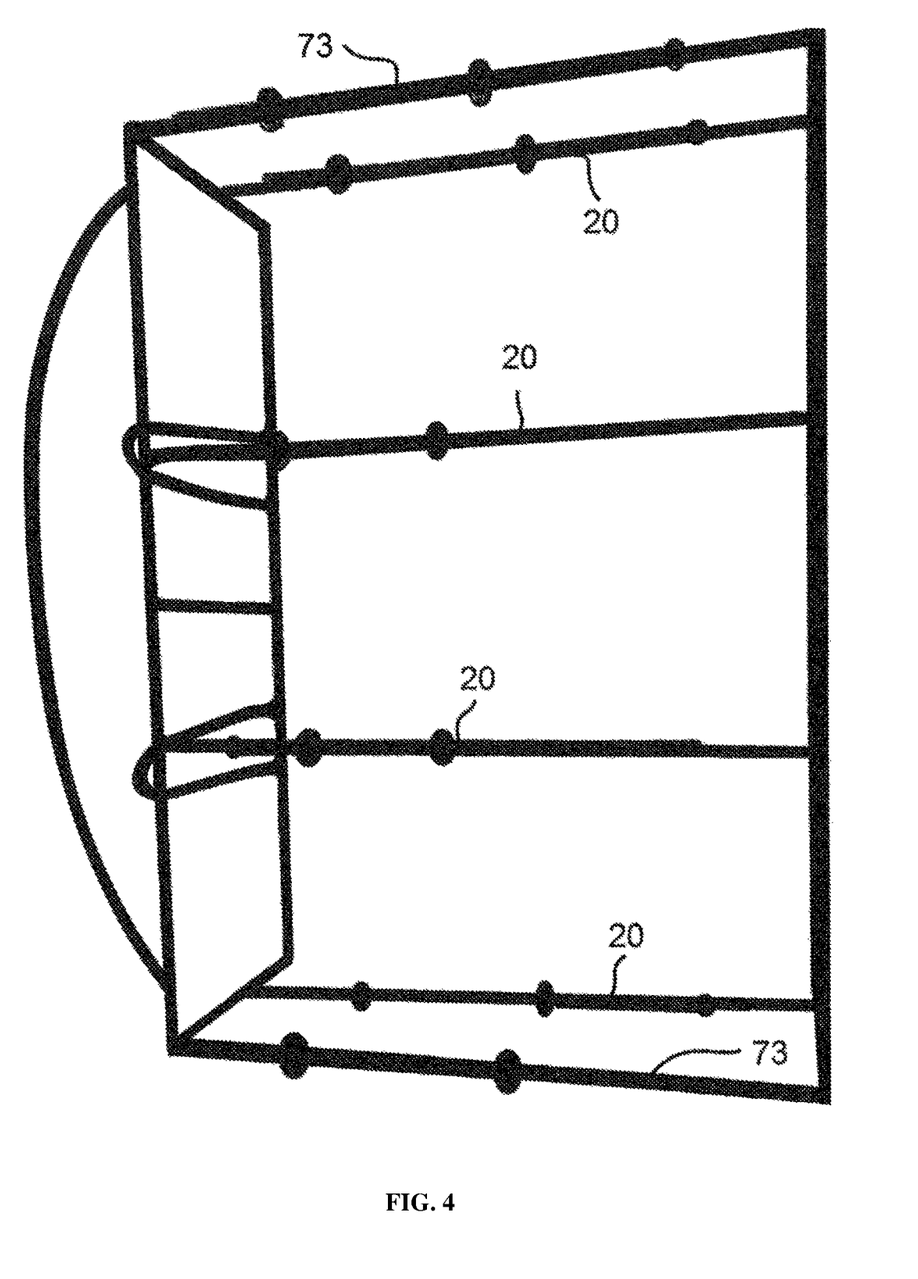
FIG. 4 is a prospective bottom view of a carrier configured to be adjustable for accommodating other tray dimensions.
Figure 5:
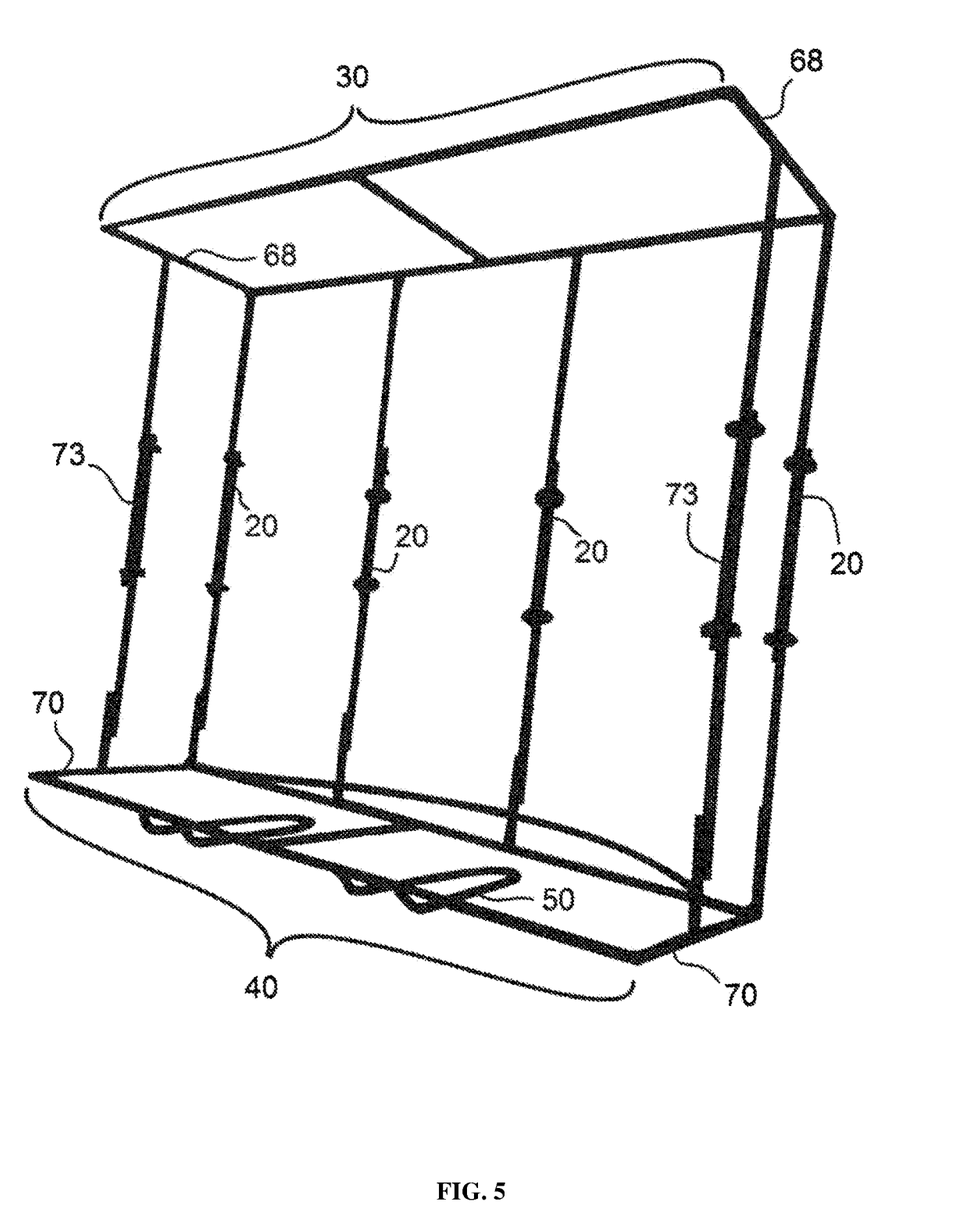
FIG. 5 is a prospective top view of a carrier configured to be adjustable for accommodating other tray dimensions.

Referring now to the drawings, FIG. 1 refers to an open-topped harvesting apparatus 10, which is also referred to as an open-topped carrier 10 used for packing berries directly into clamshell packages 90 during hand harvesting by a harvester 15. The apparatus 10 includes a plurality of bottom assemblies 20 as depicted in FIGS. 1, 4 and 5 to support a shipping tray 80 which supports a plurality of the clamshells 90. The apparatus 10 also includes a plurality of front end wall assemblies 68 affixed perpendicular to the plurality of bottom assemblies 20. The apparatus 10 additionally includes a plurality of rear end wall assemblies 70 affixed perpendicular to the plurality of bottom assemblies 20. The dotted arrow lines 53 shown in FIG. 1 do not constitute any part of the invention but illustrate where a belt 55 passes through the carrier 10.

Referring now to FIGS. 1 and 5, the apparatus 10 includes a plurality of middle wall assemblies 73 affixed perpendicular to the plurality of the front 68 and rear 70 end wall assemblies. Further, the apparatus 10 includes a first side wall assembly 30 as depicted in FIGS. 1 and 5 that is affixed perpendicular to the plurality of bottom assemblies 20 and affixed to the plurality of front end wall assemblies 68.

Referring still to FIGS. 1 and 5, the apparatus 10 further includes a second side wall assembly 40 affixed perpendicular to the plurality of bottom assemblies 20 and affixed to the plurality of rear end wall assemblies 70, the second side wall assembly 40 further including at least two belt notch-like loops 50 for allowing the carrier 10 to be placed and "secured" or "worn" on a harvester's belt 55. Additionally, the second side wall 40 further includes an arch-shaped side supporter 60 disposed on a bottom portion of the second side wall 40 for maintaining the plurality of bottom assemblies 20 substantially horizontal to the ground when worn by the harvester 15.

Figure 2:
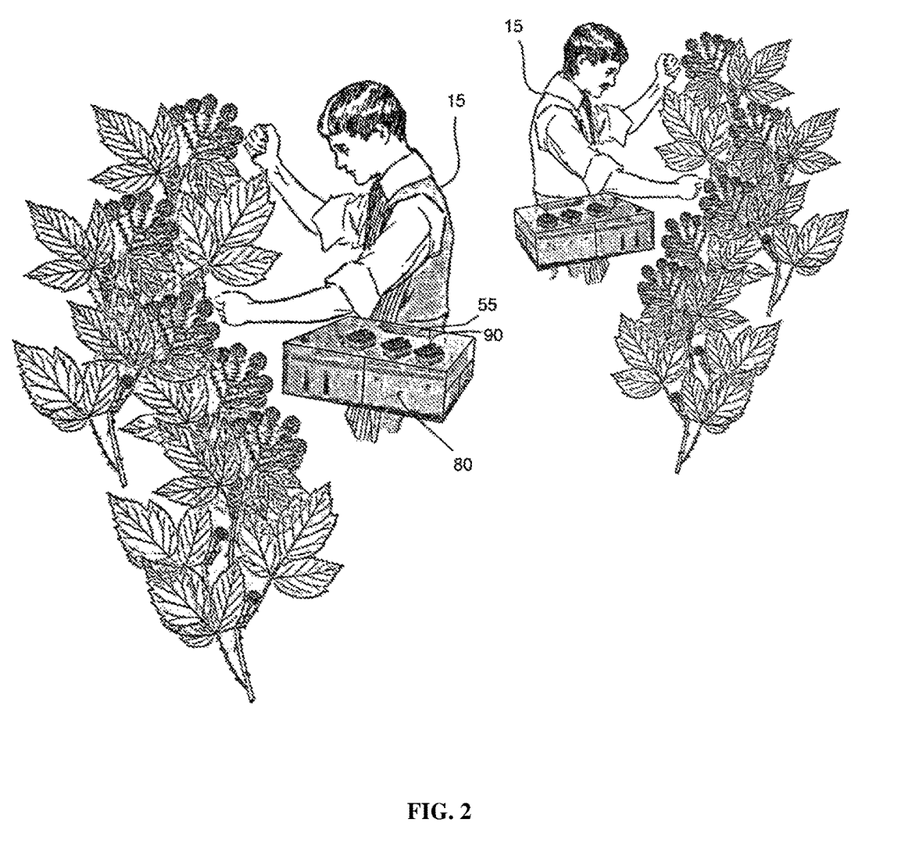
FIG. 2 is a perspective view showing harvesters wearing or securing the open-topped harvesting rack on their belt for supporting a shipping tray that includes clamshells being filled with berries picked directly from the plant.

Referring now to FIG. 2, the one touch harvesting method for picking and packing berries directly into clamshell packages 90 during hand harvesting is depicted where harvesters 15 secure or wear the apparatus 10 on their belt 55 for picking and packing of the berries. The apparatus 10 also allows the harvesters 15 to have both hands free for picking the berries. Further, the apparatus 10 supports a shipping tray 80 on the plurality of bottom assemblies 20. The shipping tray 80 also holds a plurality of clamshells 90 for accepting the berries picked directly from the plant in order to eliminate multiple touches of the berries for improving fruit quality.

Referring still to FIG. 2, the carrier 10 also has an arch-shaped side supporter 60 for maintaining the plurality of bottom assemblies 20 in a substantially horizontal position relative the ground when worn by harvesters 15. Moreover, the One Touch Harvesting Method for packing berries eliminates at least two steps in the harvesting process when compared to the current and outdated methods for harvesting and packing berries.

Figure 3:
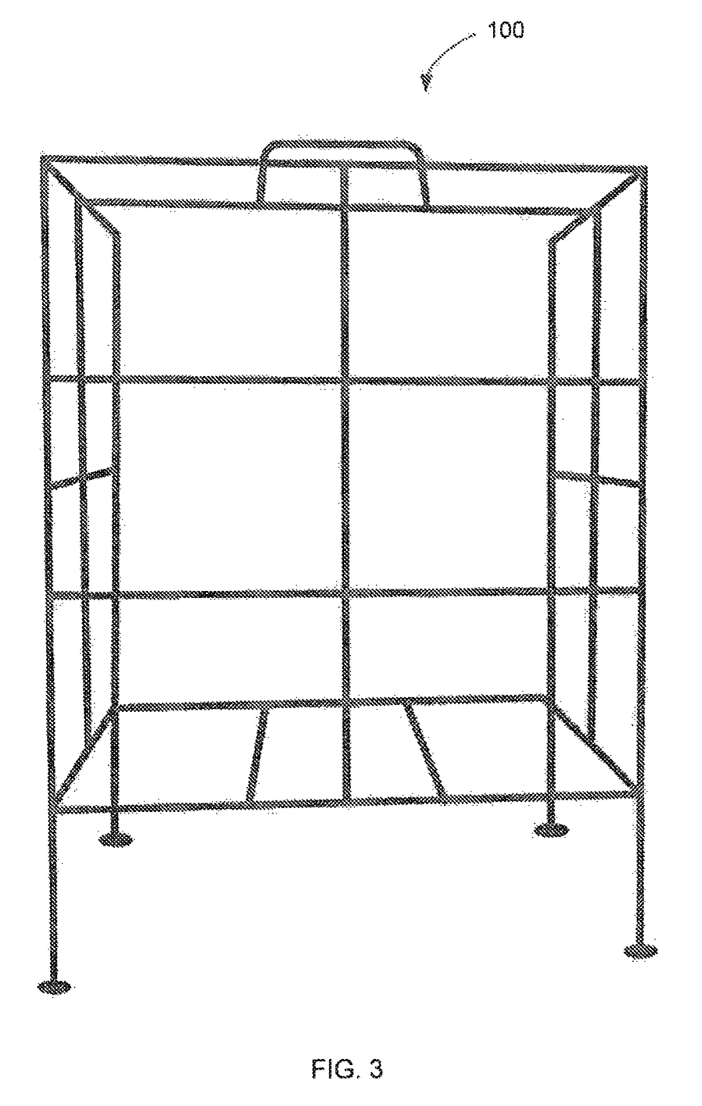
FIG. 3 is a perspective view of a carrying rack.

Referring now to FIG. 3, a three (3) tier carrying rack 100 is shown that is used to hold full shipping trays 80. Once the shipping tray 80 is entirely full with clamshells 90 which are filled completely with berries, the tray 80 is then transported onto a carrying rack 100 which is then transported to quality control personnel for inspection of the berries.

Another embodiment of the present invention also provides a method, system and apparatus 10 that provides a significant benefit of eliminating unnecessary costs such as the need for containers and plastic liners on a harvest year basis. In essence, eliminating the need for containers and plastic liners reduces unnecessary labor since the re-packing step is eliminated. Equally, eliminating multiple touches and handling of the berries also leads directly to substantial cost savings by eliminating claims based on damaged fruit.

FIGS. 4-5 depict another embodiment of the invention that provides a carrier 10 configured to be adjustable. For instance, the plurality of bottom assemblies 20 and the plurality of middle wall assemblies 73 are advantageously adjustable for accommodating other shipping tray 80 dimensions. The adjusting feature of the current invention allows the carrier 10 to accommodate different tray 80 dimensions that vary depending on the requirements of companies and/or stores.

The carrier 10 dimensions when in the closed position are 16.5"×11". When the carrier 10 is in the adjustable open position, the plurality of bottom assemblies 20 and the plurality of middle wall assemblies 73 are advantageously adjustable to the following maximum dimensions: 16.5"×14". Accordingly, the dimensions of the adjustable carrier are in the range of 16.5"×11" to 16.5" to 14".

An even further aspect of the present invention is to reduce the number of trailers needed for storing and transporting berries picked directly from the plant. This leads to less safety incidences since the terrain used for growing berries is generally uneven making it a challenge for trailers to stay upright. An illustration of a trailer or different variations of trailers are not depicted or described herein since trailers come in a large variety of configurations and are common equipment used for transporting berries.

Figure 6:
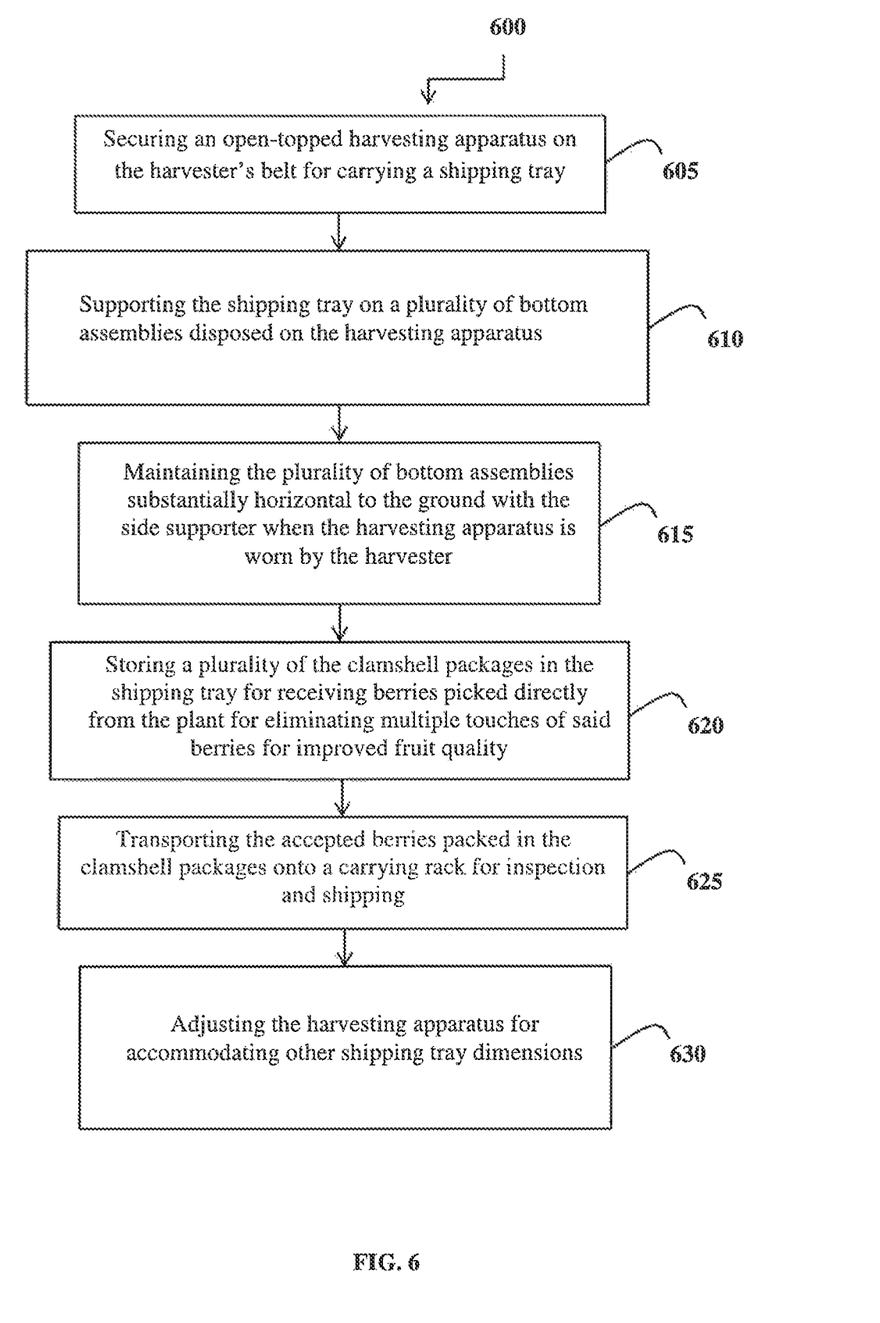
FIG. 6 represents an execution diagram for the method of packing berries directly into clamshell packages during hand harvesting with an opened-top harvesting apparatus.

As shown in FIG. 6, a method 600 of the present invention includes various beneficial steps to pack berries directly into clamshell packages during hand harvesting by a harvester using an opened-top harvesting apparatus. For instance, at block 605, the method 600 comprises the step of securing an open-topped harvesting apparatus on a harvester's belt for carrying a shipping tray.

At block 610, the method includes the step of supporting the shipping tray on a plurality of bottom assemblies disposed on the harvesting apparatus.

At block 615, the method includes the step of maintaining the plurality of bottom assemblies substantially horizontal to the ground with the side supporter when the apparatus is worn by the harvester.

At block 620, the method includes the step of storing a plurality of the clamshell packages in the shipping tray for receiving berries picked directly from the plant for eliminating multiple touches of said berries for improved fruit quality.

At block 625, the method includes the step of transporting the accepted berries packed in the clamshell packages onto a carrying rack for inspection and shipping.

At block 630, the method includes the step of adjusting the harvesting apparatus for accommodating other shipping tray dimensions.

Figure 7:
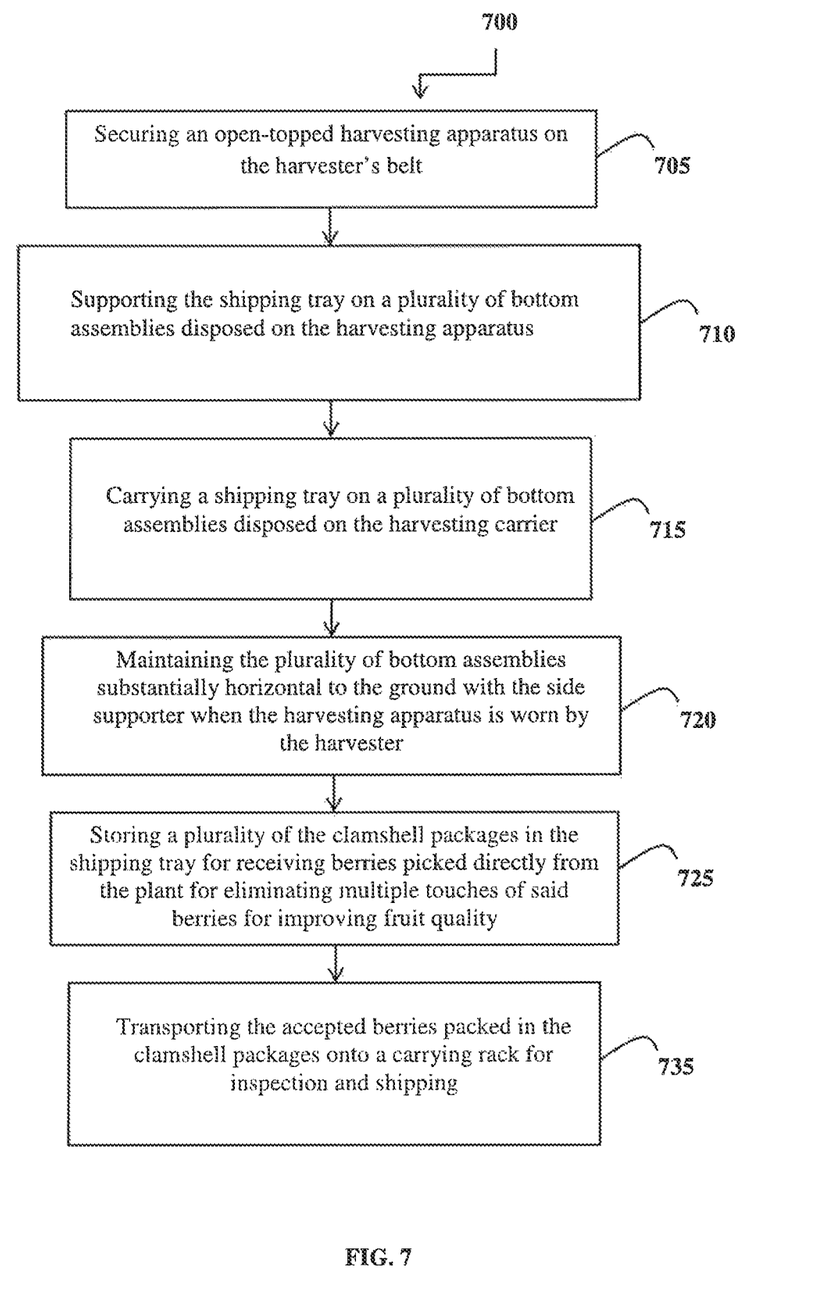
FIG. 7 represents another execution diagram for the method of packing berries directly into clamshell packages with an opened-top harvesting apparatus.

As shown in FIG. 7, a method 700 of the present invention further includes various beneficial steps to pack berries directly into clamshell packages during hand harvesting by a harvester using an opened-top harvesting apparatus. For example, at block 705, the method 700 comprises the advantageous step of securing an open-topped harvesting apparatus on a harvester's belt for carrying a shipping tray.

At block 710, the method includes the step of supporting the shipping tray on a plurality of bottom assemblies disposed on the harvesting apparatus.

At block 715, the method includes the step of carrying a shipping tray on a plurality of bottom assemblies disposed on the apparatus.

At block 720, the method includes the step of maintaining the plurality of bottom assemblies substantially horizontal to the ground with the side supporter when the harvesting apparatus is worn by the harvester.

At block 725, the method includes the step of storing a plurality of the clamshell packages in the shipping tray for receiving berries picked directly from the plant for eliminating multiple touches of said berries for improving fruit quality.

At block 735, the method includes the step of transporting the accepted berries packed in the clamshell packages onto a carrying rack for inspection and shipping.

It should be understood that the foregoing relates to exemplary embodiments of the invention and that modifications may be made without departing from the spirit and scope of the invention. It should also be understood that the present invention is not limited to the designs mentioned in this application and the equivalent designs in this description, but it is also intended to cover other equivalents now known to those skilled in the art, or those equivalents which may become known to those skilled in the art in the future.

INDUSTRIAL APPLICABILITY

The present invention pertains to a method of packing berries directly into clamshell packages during hand harvesting by a harvester with an open-topped harvesting apparatus which may be of value or importance to various industries such as, but not limited to the produce, farming, horticulture and/or agricultural industries.

What is claimed is:

1. A one touch harvesting method for packing berries directly into clamshell packages during hand harvesting by a harvester, the method comprising the following steps:
   securing an open-topped harvesting apparatus on the harvester's belt for carrying a shipping tray, the apparatus having a side supporter disposed on said apparatus and disposed below belt loops;
   supporting the shipping tray on a bottom disposed on the harvesting apparatus;
   maintaining the bottom substantially horizontal to the ground with the side supporter when the apparatus is worn by the harvester, and
   storing a plurality of the clamshell packages in the shipping tray for receiving berries picked directly from the plant for eliminating multiple touches of said berries for improved fruit quality.

2. The method according to claim 1 further including the step of transporting the accepted berries packed in the clamshell packages onto a carrying rack for inspection and shipping.

3. The method according to claim 1 further including the step of adjusting the harvesting apparatus for accommodating other shipping tray dimensions.

4. The method according to claim 3, wherein the bottom comprises a plurality of assemblies being adjustable.

5. The method according to claim 1, wherein the side supporter is configured to be arch-shaped, and elongated.

6. The method according to claim 1, wherein the belt loops comprise notch-like loops.

7. A one touch harvesting method for packing berries directly into clamshell packages during hand harvesting by a harvester, the method comprising the following steps:
   securing an open-topped harvesting apparatus on the harvester's belt, the apparatus having a side supporter disposed thereon and disposed below belt loops;
   carrying a shipping tray on a bottom disposed on the harvesting apparatus;

maintaining the bottom substantially horizontal to the ground with the side supporter when the apparatus is worn by the harvester; and storing a plurality of the clamshell packages in the shipping tray for receiving berries picked directly from the plant for eliminating multiple touches of said berries for improving fruit quality.

8. The method according to claim 7, wherein the open-topped harvesting apparatus is adjustable for accommodating other tray dimensions.

9. The method according to claim 8, wherein the bottom comprises a plurality of assemblies being adjustable.

10. The method according to claim 7, wherein the open-topped harvesting apparatus is made of rigid material comprised of heavy-gauge wire, wicker metal, wood, metal, plastic or steel.

11. The method according to claim 7, wherein the dimensions of the open-topped harvesting carrier in the non-adjusted or closed position is 16.5"×11".

12. The method according to claim 7, wherein the dimensions of the adjustable open-topped harvesting apparatus are in the range of 16.5"×11" to 16.5" to 14".

13. The method according to claim 7 further including the step of transporting the accepted berries packed in the clamshell packages onto a carrying rack for inspection and shipping.

14. The method according to claim 7, wherein the belt loops comprise notch-like loops.

15. A one touch harvesting method for packing berries directly into clamshell packages during hand harvesting by a harvester, the method comprising the following steps:

securing an open-topped harvesting apparatus on the harvester's belt for carrying a shipping tray, the apparatus having an elongated arch-shaped side supporter disposed thereon and disposed below belt notch-like loops;

supporting the shipping tray on a plurality of bottom assemblies disposed on the apparatus;

maintaining the plurality of bottom assemblies substantially horizontal to the ground with the side supporter when the apparatus is worn by the harvester;

storing a plurality of the clamshell packages in the shipping tray for receiving berries picked directly from the plant for eliminating multiple touches of said berries for improved fruit quality; and transporting the accepted berries packed in the clamshell packages onto a carrying rack for inspection and shipping.

16. The method according to claim 15 further including the step of adjusting the harvesting apparatus for accommodating other shipping tray dimensions.

17. The method according to claim 16, wherein the plurality of bottom assemblies being adjustable.

\* \* \* \* \*